US009357372B1

(12) United States Patent
Ridel et al.

(10) Patent No.: US 9,357,372 B1
(45) Date of Patent: May 31, 2016

(54) METHODS FOR SUPPORTING ROAMING SERVICES BY A DIAMETER AGENT AND DEVICES THEREOF

(71) Applicant: Traffix Communication Systems Ltd., Hod HaSharon (IL)

(72) Inventors: Leonid Ridel, Hod HaSharon (IL); Petrus Wilhelmus Adrianus Jacobus Maria Nas, Den Haag (NL)

(73) Assignee: Traffix Communication Systems Ltd., Hod HaSharon (IL)

( * ) Notice: Subject to any disclaimer, the term of this patent is extended or adjusted under 35 U.S.C. 154(b) by 0 days.

(21) Appl. No.: 14/204,874

(22) Filed: Mar. 11, 2014

Related U.S. Application Data

(60) Provisional application No. 61/776,871, filed on Mar. 12, 2013.

(51) Int. Cl.
*H04M 11/00* (2006.01)
*H04W 8/06* (2009.01)
*H04M 15/00* (2006.01)

(52) U.S. Cl.
CPC ............ *H04W 8/06* (2013.01); *H04M 15/8038* (2013.01)

(58) Field of Classification Search
CPC .......................... H04W 8/06; H04M 15/8038
See application file for complete search history.

(56) References Cited

U.S. PATENT DOCUMENTS

2004/0162058 A1* 8/2004 Mottes ................ H04M 3/4228
455/411
2010/0190492 A1* 7/2010 Jiang ..................... H04M 15/55
455/432.1

OTHER PUBLICATIONS

Meyer D., "Europe agrees on changes for cheaper roaming", ZDNet, Mar. 28, 2012, pp. 1-2, (http://www.zdnet.co.uk/news/regulation/2012/03/28/europe-agrees-on-changes-for-cheaper-roaming-40154908/).
Stuckmann P., "EU Roaming Regulation—towards structural solutions" European Commission Information Society and Media, Mar. 2012, pp. 1-22, (http://www.wto.org/english/tratop_e/serv_e/sym_march12_e/presentation_stuckmann.pdf).
"EC Tackles Mobile Data Bill Shock", LightReading, May 11, 2012, (http://www.lightreading.com/document.asp?doc_id=220822&f_src=lrmobiledailynewsletter).
Telekom, Austria Group., "Unbundling roaming services", Telekom, Austria Group, Feb. 2011, pp. 1-21, (http://www.google.nl/search?q=unbundling+roaming+mvno+ec&ie=UTF-8&oe=UTF-8&hl=nl&client=safari).
"Roaming", Digital Agenda for Europe, Jan. 9, 2014, pp. 1-4, (http://ec.europa.eu/information_society/activities/roaming/index_en.htm).

* cited by examiner

*Primary Examiner* — Chuong A Ngo
(74) *Attorney, Agent, or Firm* — LeClairRyan, a Professional Corporation

(57) ABSTRACT

A method, non-transitory computer readable medium and device that determines a provider of wireless communication services includes receiving a request for wireless communication services from a computerized mobile device of a roaming user. A type of request for wireless communication services is identified. A mobile network operator is determined according to type of requested wireless communication service, location of the user, time, and availability of the requested wireless communication service. The mobile network operator is at least one of Mobile Virtual Network Operator (MVNO) or local network operator. Active elements in the determined mobile network operator are calculated. A check is made of which network elements in a home network of the user should be addressed. The home network of the user is a network of a provider of a wireless communication service where the user is registered.

27 Claims, 5 Drawing Sheets

METHODS FOR SUPPORTING ROAMING SERVICES BY A DIAMETER AGENT AND DEVICES THEREOF

This application claims the benefit of U.S. Provisional Patent Application Ser. No. 61/776,871 filed Mar. 12, 2014, which is hereby incorporated by reference in its entirety.

FIELD

This technology generally relates to the field of roaming services for wireless devices, mainly by a virtual wireless communications services provider.

SUMMARY

According to some examples of this technology, a method for determining a provider of wireless communication services includes receiving a request for wireless communication services from a computerized mobile device of a roaming user. A type of request for wireless communication services is identified. A mobile network operator is determined according to type of requested wireless communication service, location of the user, time, and availability of the requested wireless communication service. The mobile network operator is at least one of Mobile Virtual Network Operator (MVNO) or local network operator. Active elements in the determined mobile network operator are calculated. A check is made of which network elements in a home network of the user should be addressed. The home network of the user is a network of a provider of a wireless communication service where the user is registered.

BRIEF DESCRIPTION OF THE DRAWINGS

This technology will be more readily understood from the detailed description of examples thereof made in conjunction with the accompanying drawings of which.

DETAILED DESCRIPTION

Figure 1:
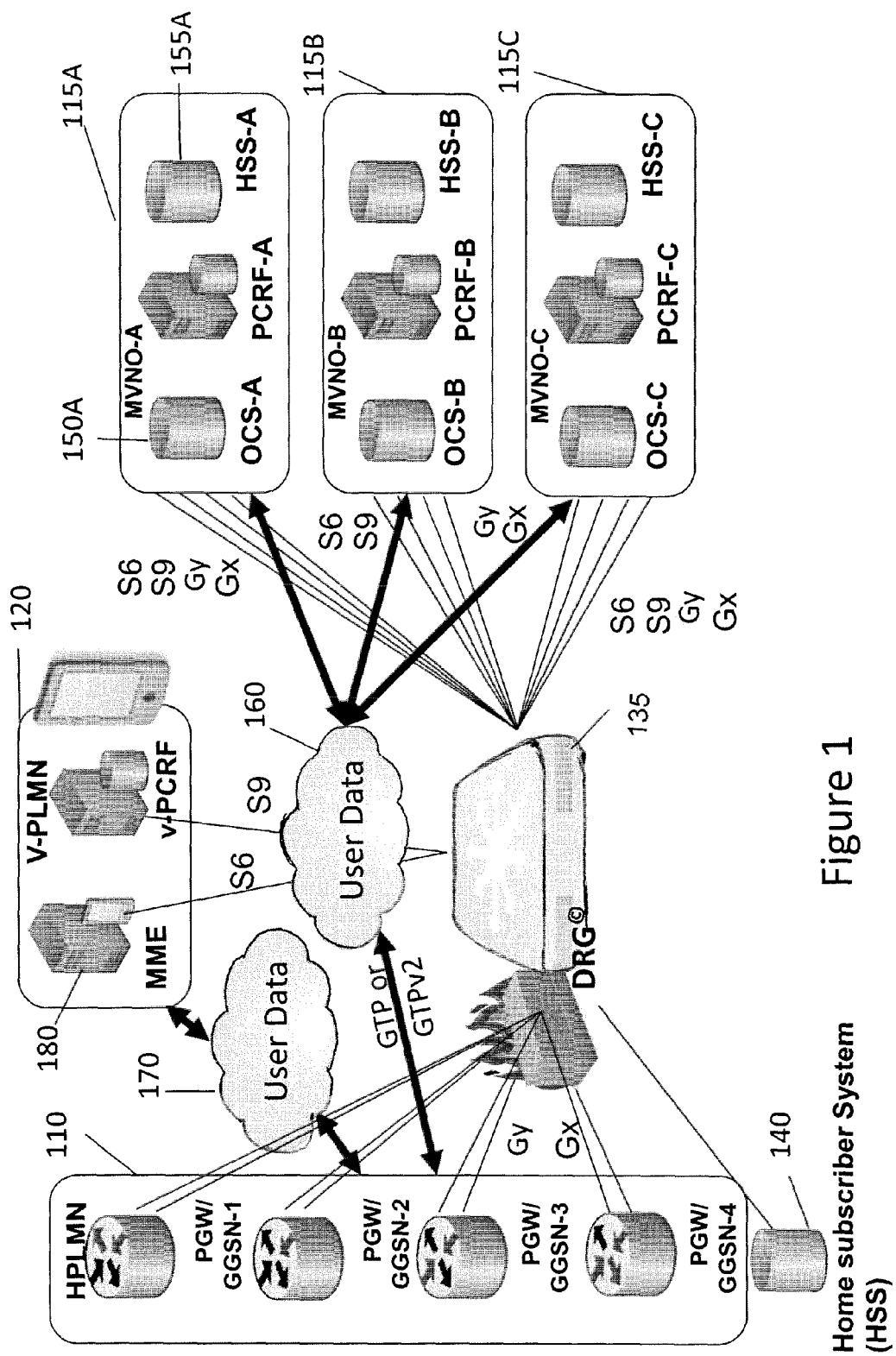
FIG. 1 is a block diagram of network architecture of a system for providing roaming services by a diameter roaming gateway (DRG) computing device, according to some examples of this technology.

Before explaining at least one example of this technology in details, it is to be understood that this technology is not limited in its application to the details of construction and the arrangement of the components set forth in the following description or illustrated in the drawings. This technology is applicable to other examples and/or may be practiced or carried out in various ways. Also, it is to be understood that the phraseology and terminology employed herein is for the purpose of description and should not be regarded as limiting.

For a better understanding of this technology, the usages of the following terms in the present disclosure are defined in a non-limiting manner:

The term "diameter protocol" as used herein in this application, is defined as an Authentication, Authorization, and Accounting (AAA) protocol.

The term "diameter node" as used herein in this application, is defined as a Peer-To-Peer architecture. Every host which implements the diameter protocol can act as either a client or a server depending on network deployment. Therefore, the term diameter node is used to refer to a diameter client, a diameter server, or a diameter agent. A diameter node may act as a diameter client or a diameter server, depending on the situation unless the diameter node is defined as a diameter agent.

The term "Mobile Virtual Network Operator (MVNO)" as used herein in this application, is defined as a wireless communications services provider that provides mobile services to its customers over radio spectrum or wireless network infrastructure over which the MVNO does not own.

The term "mobile service" as used herein in this application, is defined as user data (e.g. data from the internet), Short Message service (SMS) and voice data.

The term "air interface" as used herein in this application, is defined as a radio-based communication link between the mobile station and the active base station in mobile or wireless communication.

The term "Universal Mobile Telecommunications System (UMTS)" as used herein in this application, is defined as a 3rd mobile cellular system for networks based on the Global System for Mobile (GSM) standard.

The term "Universal Terrestrial Radio Access (UTRA)" as used herein in this application, is defined as a terrestrial air interface with a standard for 3G mobile communications services being specified by 3rd Generation Partnership Project (3GPP).

The term "evolved UTRA (E-UTRA)" as used herein in this application, is the air interface of 3GPP's Long Term Evolution (LTE) upgrade path for mobile networks.

The term "International Mobile Subscriber Identity (IMSI)" as used herein in this application, is defined as a unique identification associated with all GSM, UMTS and Long Term Evolution (LTE) network Subscriber Identity Module (SIM) cards. It is stored as a 64 bit field and is sent by the mobile phone to the network. It is also used for acquiring other details of the mobile phone in the Home Location Register (HLR) or as locally copied in the Visitor Location Register.

With the EU regulation on prices of Data Roaming for Mobile Virtual Network Operator (MVNO) a new area of diameter routing is needed in the market. Furthermore, multiple MVNOs are available in different locations and different times for different mobile service. Meaning, for a specific user of a mobile phone that is located in a certain place, various MVNOs may provide different services. For example, a user located in Paris, France may choose one MVNO to provide the user SMS services and another MVNO to provide user data. The user may choose a local provider, i.e. Home Public Land Mobile Network (HPLMN) for voice data, for making regular phone calls. Another example may be the user from the previous example traveling to London, UK. The user may choose different MVNOs for SMS and user data and an HPLMN in London for a MVNO.

FIG. 1 is a block diagram illustrating network architecture of a system for providing roaming services by a diameter roaming gateway (DRG) computing device 135, according to some examples of this technology.

According to some examples of this technology, a diameter roaming gateway (DRG) computing device 135 is a combination of advance diameter routing functions targeting the requirements for routing international diameter traffic. The DRG 135 allows a user to receive mobile services from more than one wireless communications services provider. Additionally, the DRG 135 gives the user flexibility in receiving wireless communications services according to location, time and availability of service. That is includes receiving wireless communications services in a specific location from different providers during the same day.

According to some examples of this technology, DRG 135 is connecting components in V-PLMN 120 with components in H-PLMN 110 and multiple MVNOs 115A-115C.

According to some examples of this technology, billing services for the wireless communications services that were consumed may be provided by either the MVNO from which the service was consumed from or by a local provider, i.e. HPLMN 110. Each MVNO may have an Online Charging System (OCS) 150A for billing services.

According to some examples of this technology, user data, i.e. data that is coming from the internet 160, may be transferred via DRG 135 and in some cases user data 170 may not be transferred via HPLMN 110, but via MVNO only. For example, when a user is surfing local internet websites. Therefore, only the control signaling has to be transferred via the HPLMN 110 for billing purposes.

According to some examples of this technology, the DRG 135 has multiple interfaces; each interface is for communication between certain components in different networks. For example, interface S6 is for communication between Mobility Management Entity (MME) 180 in V-PLMN 120 and Home Subscriber System (HSS) 155A in MVNO-A 115A. Interface S8 is for communication between Signaling Gateway (SGW) (not shown) and Packet Data Network Gateway (PGW) in HPLMN 110. Interface S9 is for communication between Home Policy charging and Rules Function (H-PCRF) in HPLMN 110 and virtual PCRF (V-PCRF) in one of MVNOs 115A-115C.

Figure 2:
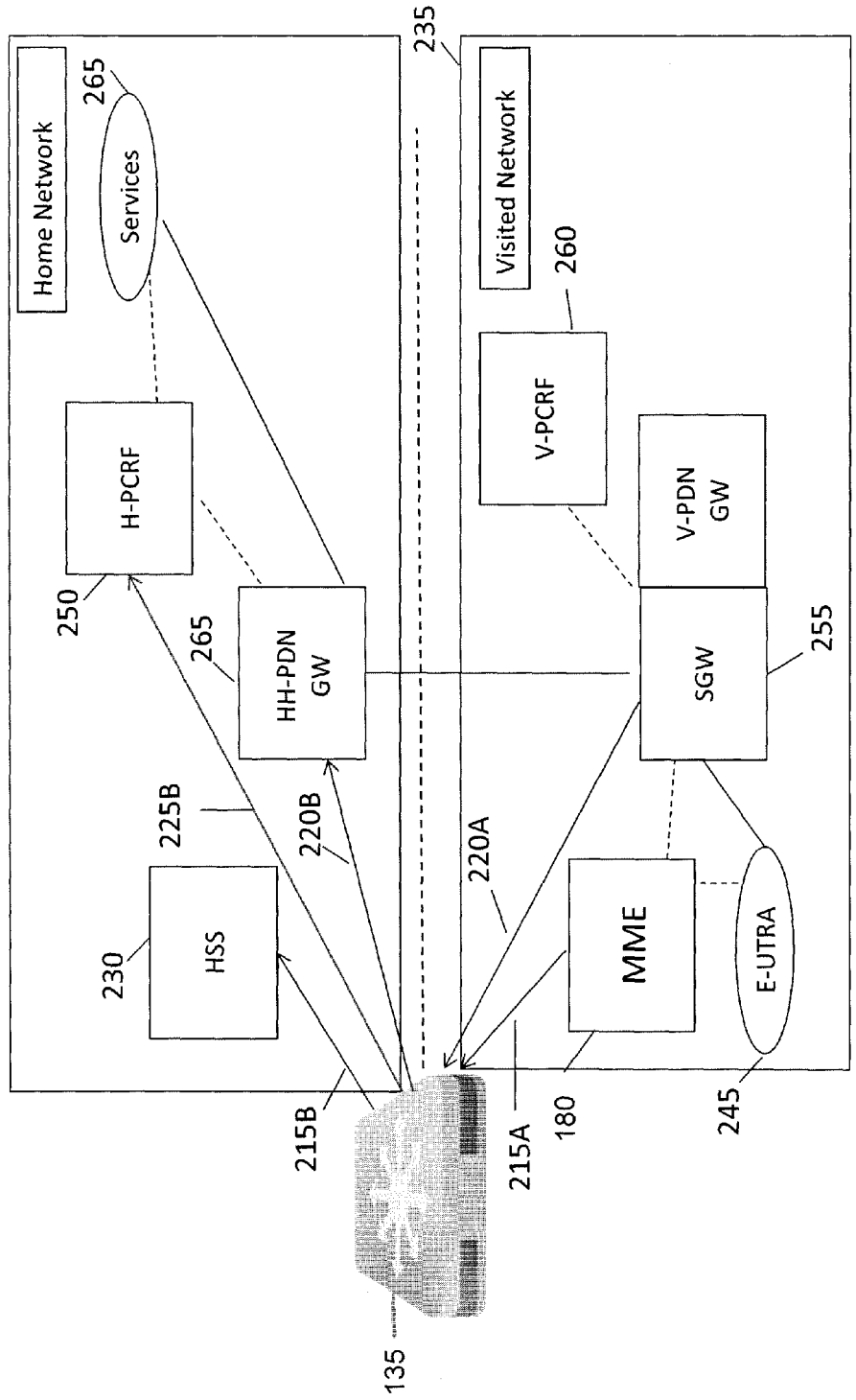
FIG. 2 is a block diagram of a communication of a communication device in a visited network via a diameter roaming gateway (DRG) computing device with a home network, according to some examples of this technology.

FIG. 2 is a block diagram illustrating communication of a mobile device in a visited network via a diameter roaming gateway (DRG) computing device with home network, according to some examples of this technology.

According to some examples of this technology, in case of a user on a mobile device that consumes roaming services from a visited network 235 some components, such as MME 180 or E-UTRA 245, may connect with components in the HPLMN such as HSS 230 or H-PCRF 250 via DRG 210. Alternatively, component, such as V-PCRF 260, in the visited network 235 may connect directly via SGW 255 with H-PCRF 250 via H-PDN GW 265.

Figure 3:
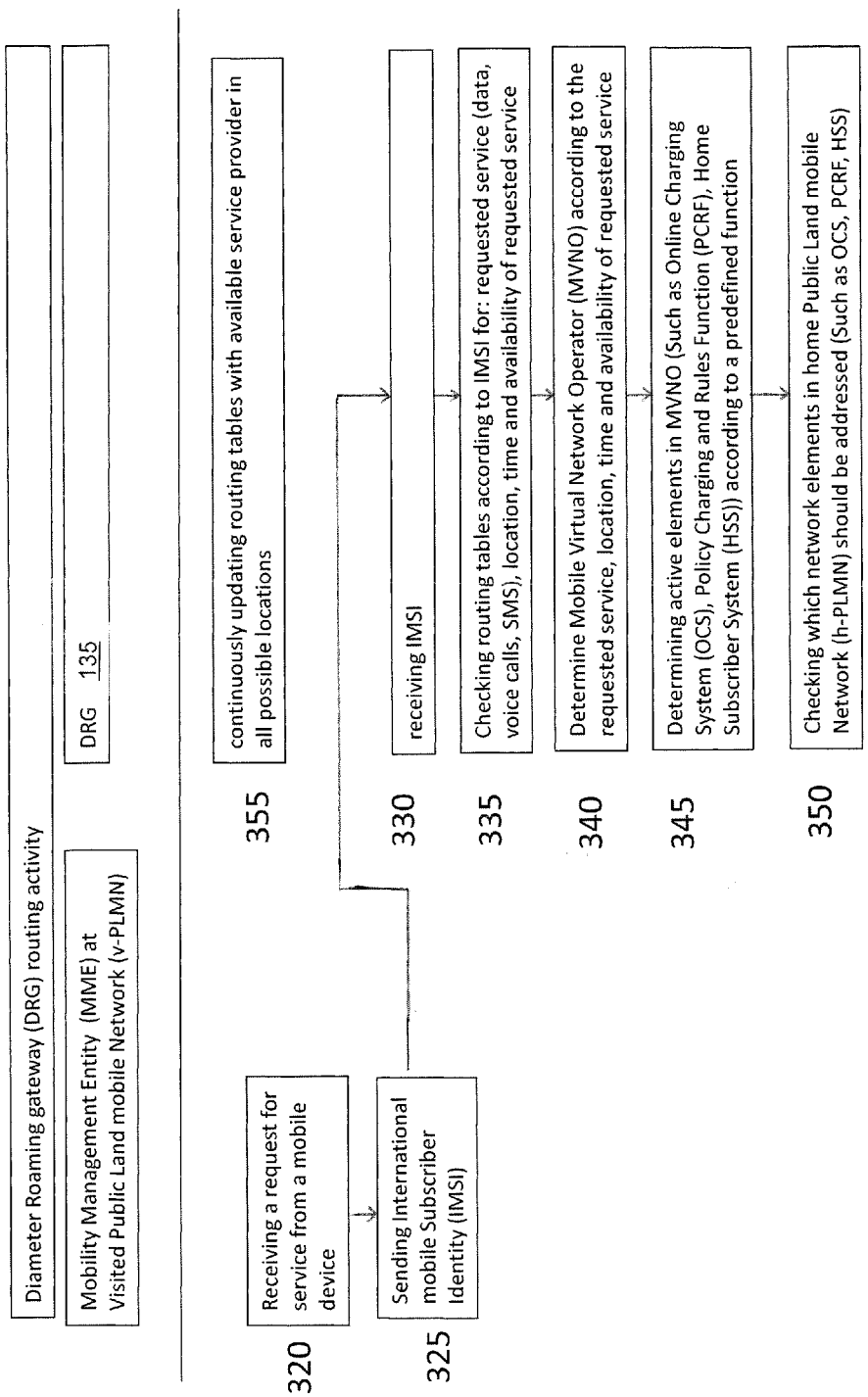
FIG. 3 is a flowchart of a routing activity with a Diameter Roaming gateway (DRG) computing device, according to some examples of this technology.

FIG. 3 is a flow chart illustrating diameter roaming gateway (DRG) routing activity, according to some examples of this technology.

According to some examples of this technology, a DRG 135 may continuously update routing tables with available wireless communications service of a provider, in all predefined locations as illustrated in block 355.

According to some examples of this technology, when a user of a mobile device or other device or component is located out of her or his provider's coverage area of wireless communications services, the user may consume roaming services from a V-PLMN. The process of consumption of roaming services may start in step 310 by a Mobility Management Entity (MME) component 180 in the V-PLMN 120 that is receiving a request for service in step 320 from a computerized mobile device of the user. Upon reception of a request for service the MME 180 may send International Mobile Subscriber Identity (IMSI) to a DRG 135 (stage 325).

According to some examples of this technology, the DRG 135 upon receiving the IMSI in step 330 may check in step 335 the routing tables according to the received IMSI for one or more of the following parameters: (i) requested service, such as user data, voice call, and/or SMS; (ii) location of the computerized mobile device that is requesting the wireless communication service; (iii) time of the request; and (iv) availability of the requested service.

According to some examples of this technology, according to the parameters that were checked in step 335 the DRG 135 may determine a Mobile Virtual Network Operator (MVNO) in step 340.

According to some examples of this technology, the DRG 135 may determine active elements in the selected MVNO according to a predefined function in step 345. The active elements in the selected MVNO may be Online Charging System (OCS), PCRF and HSS, meaning, that these elements, which are located in the MVNO network are performing the billing in case of OCS or implementing policy charging and rules functions in case of PCRF element.

According to some examples of this technology, the DRG 135 may check which network elements in the home network i.e. H-PLMN should be addressed in step 350. The elements may be OCS, PCRF and/or HSS.

Figure 4:
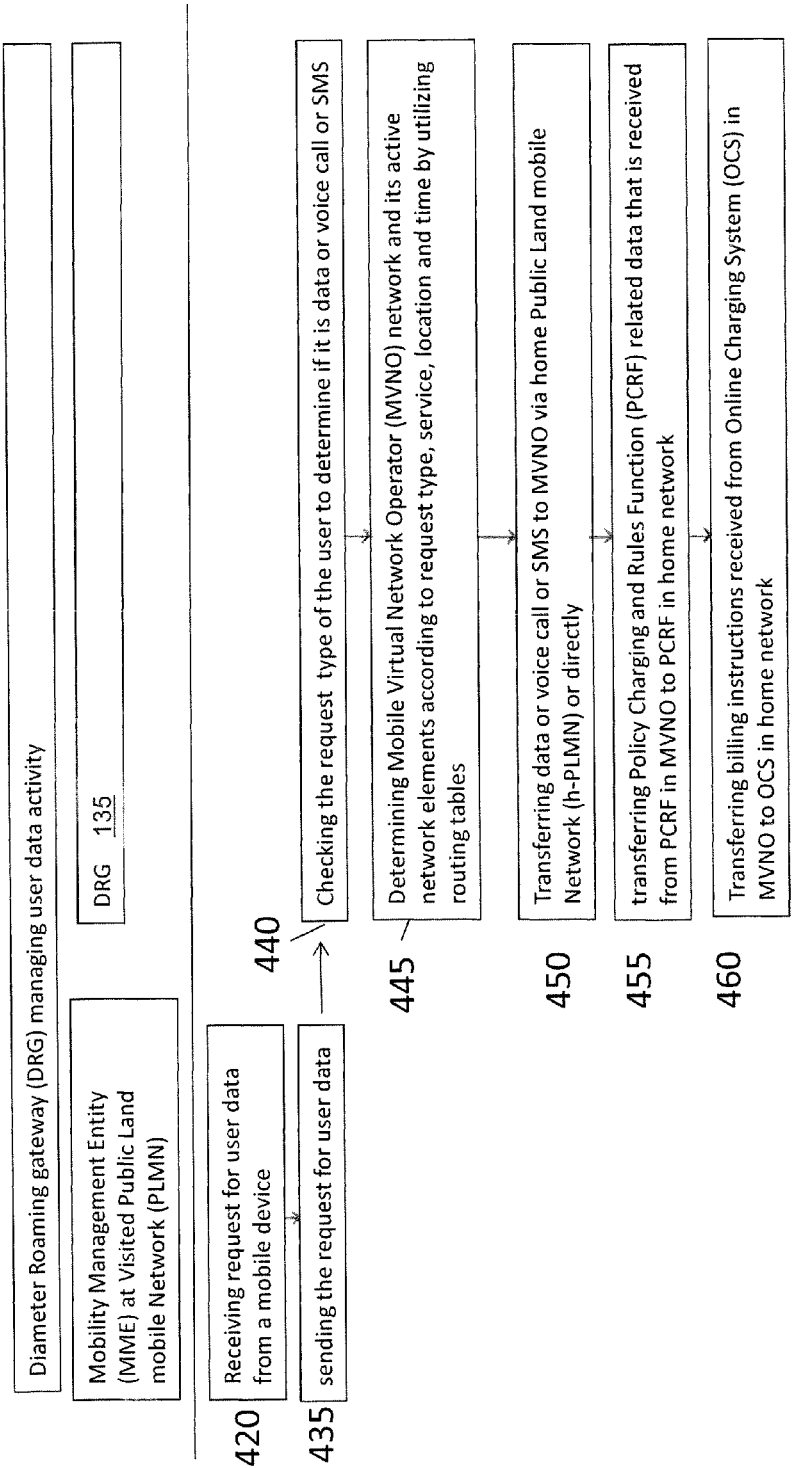
FIG. 4 is a flowchart of activity of routing user data with a diameter roaming gateway (DRG) computing device, according to some examples of this technology.

FIG. 4 is a flow chart illustrating the activity of a diameter roaming gateway (DRG) that is routing user data, according to some examples of this technology.

According to some examples of this technology, in a non-limiting example, a user from London, UK that is traveling in Paris, France, would like to receive weather forecast information from the internet. The user is not in an area that is covered by the user's local wireless communication service (i.e. an area where the wireless communication services of the provider that the user has registered with are available) and therefore that user is consuming roaming service. Before the user enters an internet website the MME 180 receives a request for user data from a computerized mobile device in step 420 and sends it to a DRG 135 in step 435. In another non limiting example, the user may request SMS service or voice data (i.e. voice calls).

According to some examples of this technology, upon reception of the request for user data the DRG 135 is checking the request for service to determine its type in step 440. The request for service may be (i) user data; (ii) voice data (i.e. the user is trying to make a phone call); (iii) SMS.

According to some examples of this technology, after the DRG 135 checked the type of request it may utilize routing tables to determine the MVNO that may provide the requested service to the user and the active elements of the MVNO in step 445. The MVNO is determined according to the request type, location, time and availability of service.

According to some examples of this technology the DRG may support transferring rules and data between active elements at the MVNO and an active element of the HPLMN in case only part of the active elements at the MVNO exist or chosen for usage.

According to some examples of this technology, in case the Online Charging System (OCS) in the MVNO is not activated and the OCS element in the home network performs the billing, the DRG 135 may transfer Policy Charging and Rules Function (PCRF) related data that is received from the PCRF component in the MVNO to PCRF component in home network i.e. HPLMN. The OCS may later on charge the user upon the roaming services that were provided in step 455.

According to some examples of this technology, in case OCS for example 150A in FIG. 1 is active in the MVNO 115A for example it may perform calculation of the billing to be charged from the user that is consuming roaming services and transfer the billing related data to the OCS in the home network in step 460.

Figure 5:
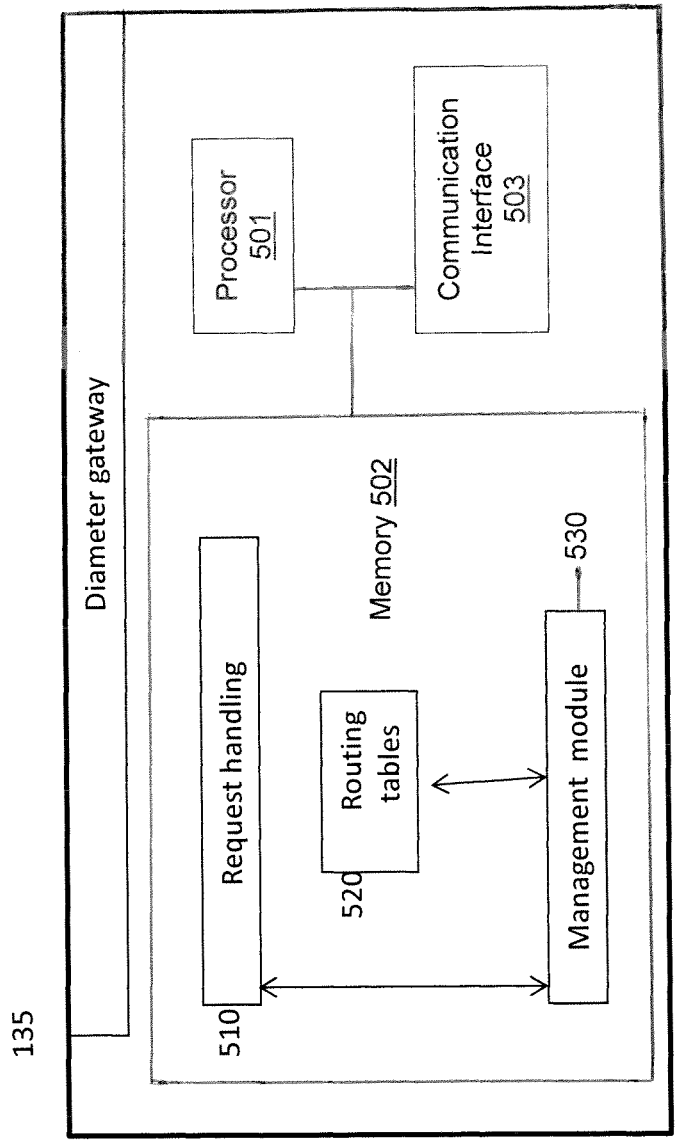
FIG. 5 is a partial block and partial diagram of a diameter gateway computing device, according to some examples of this technology.

FIG. 5 is a partial block and partial functional block diagram illustrating activity of a diameter roaming gateway (DRG) computing device 135, according to some examples of this technology. In some examples, the diameter roaming gateway (DRG) computing device 135 includes a processor 501, a memory 502, and a communication interface 503 which are coupled together by one or more buses or other links, although the diameter roaming gateway (DRG) computing device 135 may include other types and/or numbers of systems, device, components and/or other elements in other configurations.

The processor 501 of the diameter roaming gateway (DRG) computing device 135 may execute one or more programmed instructions stored in the memory 502 for determining a provider of wireless communication service as illustrated and described in the examples herein, although other types and numbers of functions and/or other operation can be performed. The processor 501 of the diameter roaming gateway (DRG) computing device 135 may include one or more central processing units and/or general purpose processors with one or more processing cores, for example.

The memory 502 of the diameter roaming gateway (DRG) computing device 135 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 501, can be used for the memory 502. The memory 501 may also include one or more of: a request handling module 510; one or more routing tables 520; and a management module 530, although the memory may include other types and/or numbers of modules, programmed instructions, and/or other data, such as other routing tables.

The communication interface 503 of the diameter roaming gateway (DRG) computing device 135 operatively couples and communicates between the diameter roaming gateway (DRG) computing device 135 to other equipment, systems, devices, and/or components by way of example only, although other types and numbers of communication interfaces and connections and configurations to other equipment, systems and/or devices may be used.

According to some examples of this technology, the activity of the diameter gateway 135 may start in receiving a request to handle from a diameter client by the request handling module 510. The request for handling is transmitted to a management module 520 which may retrieve routing related information from routing tables 520 for determining the MVNO.

Reference in the specification to "some examples", "an example", "one example" or "other examples" means that a particular feature, structure, or characteristic described in connection with the examples is included in at least some examples, but not necessarily all examples, of this technology.

It is to be understood that the phraseology and terminology employed herein is not to be construed as limiting and are for descriptive purpose only.

The principles and uses of the teachings of this technology may be better understood with reference to the accompanying description, figures and examples. It is to be understood that the details set forth herein do not construe a limitation to an application of this technology.

Furthermore, it is to be understood that this technology can be carried out or practiced in various ways and that this technology can be implemented in examples other than the ones outlined in the description above. It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe examples, this technology is not limited to those diagrams or to the corresponding descriptions. For example, flow need not move through each illustrated box or state, or in exactly the same order as illustrated and described.

Methods of this technology may be implemented by performing or completing manually, automatically, or a combination thereof, selected steps or tasks. The term "method" may refer to manners, means, techniques and procedures for accomplishing a given task including, but not limited to, those manners, means, techniques and procedures either known to, or readily developed from known manners, means, techniques and procedures by practitioners of the art to which this technology belongs.

The descriptions, examples, methods and materials presented in the claims and the specification are not to be construed as limiting but rather as illustrative only. Meanings of technical and scientific terms used herein are to be commonly understood as by one of ordinary skill in the art to which this technology belongs, unless otherwise defined. This technology may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some examples of this technology shall not be construed as an admission that such reference is available as prior art to this technology.

Additionally, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s)

that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

This technology also may be embodied as a non-transitory computer readable medium having instructions stored thereon for one or more aspects of the present technology as described and illustrated by way of the examples herein, which when executed by the processor, cause the processor to carry out the steps necessary to implement the methods of this technology as described and illustrated with the examples herein.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for determining a provider of wireless communication services, the method comprising:
    receiving, by a diameter roaming gateway computing device, a request for wireless communication services from a mobile device of a roaming user;
    identifying, by the diameter roaming gateway computing device, from the received request at least one of a plurality of categories of wireless communication services; and
    determining, by the diameter roaming gateway computing device, a mobile network operator using one or more predefined rules based at least on the identified one of the plurality of categories of wireless communication services, a location of the mobile device, and availability of the identified one of the plurality of categories of wireless communication service, wherein the mobile network operator is at least one of Mobile Virtual Network Operator (MVNO) or a local network operator.

2. The method of claim 1 further comprising determining, by the diameter roaming gateway computing device, at least one active element in the determined mobile network operator, wherein the at least one active element is preforming a specific service based on a user request.

3. The method of claim 2 wherein the at least one active element is at least one of Online Charging System (OCS), Policy Charging and Rules Function (PCRF) or Home Subscriber System (HSS).

4. The method of claim 1 further comprising checking, by the diameter roaming gateway computing device, which one or more network elements in a home network of the mobile device of a roaming user should be addressed.

5. The method of claim 1 further comprising continuously updating, by the diameter roaming gateway computing device, routing tables of available wireless communications services.

6. The method of claim 5 wherein the determining the MVNO is further based on the identified one of the plurality of categories of wireless communication services using one or more of the routing tables.

7. The method of claim 6 further comprising transferring, by the diameter roaming gateway computing device, rules and data between active elements at the MVNO and an active element of the HPLMN.

8. The method of claim 7 wherein the transferred rules comprise at least Policy Charging and Rules Function received from the PCRF component in the MVNO to PCRF component in HPLMN.

9. The method of claim 7 wherein the transferred data is a received calculation of the billing to be charged the mobile device of the roaming user that is consuming roaming services and transfer the billing related data to the OCS in a home network for the mobile device of a roaming user.

10. A communication server device comprising:
    at least one processor;
    at least one memory coupled to the processor configured to execute programmed instructions stored in the memory comprising:
        receiving a request for wireless communication services from a mobile device of a roaming user;
        identifying from the received request at least one of a plurality of categories of wireless communication services; and
        determining a mobile network operator using one or more predefined rules based at least on the identified one of the plurality of categories of wireless communication services, a location of the mobile device, and availability of the identified one of the plurality of categories of wireless communication service, wherein the mobile network operator is at least one of Mobile Virtual Network Operator (MVNO) or a local network operator.

11. The device of claim 10 wherein the processor is further configured to execute programmed instructions stored in the memory further comprising determining at least one active element in the determined mobile network operator, wherein the at least one active element is preforming a specific service based on a user request.

12. The device of claim 11 wherein the at least one active element is at least one of Online Charging System (OCS), Policy Charging and Rules Function (PCRF) or Home Subscriber System (HSS).

13. The device of claim 10 wherein the processor is further configured to execute programmed instructions stored in the memory further comprising checking which one or more network elements in a home network of the mobile device of a roaming user should be addressed.

14. The device of claim 10 wherein the processor is further configured to execute programmed instructions stored in the memory further comprising continuously updating routing tables of available wireless communications services.

15. The device of claim 14 wherein the processor is further configured to execute programmed instructions stored in the memory for the determining wherein the determining the MVNO is further based on the identified one of the plurality of categories of wireless communication services using one or more of the routing tables.

16. The device of claim 15 wherein the processor is further configured to execute programmed instructions stored in the memory further comprising transferring rules and data between active elements at the MVNO and an active element of the HPLMN.

17. The device of claim 16 wherein the transferred rules comprise at least Policy Charging and Rules Function received from the PCRF component in the MVNO to PCRF component in HPLMN.

18. The device of claim 16 wherein the transferred data is a received calculation of the billing to be charged the mobile device of the roaming user that is consuming roaming services and transfer the billing related data to the OCS in a home network for the mobile device of a roaming user.

19. A non-transitory computer readable medium having stored thereon instructions for determining a provider of wireless communication services comprising executable code which when executed by a processor, causes the processor to perform steps comprising:
   receiving a request for wireless communication services from a mobile device of a roaming user;
   identifying from the received request at least one of a plurality of categories of wireless communication services; and
   determining a mobile network operator using one or more predefined rules based at least on the identified one of the plurality of categories of wireless communication services, a location of the mobile device, and availability of the identified one of the plurality of categories of wireless communication service, wherein the mobile network operator is at least one of Mobile Virtual Network Operator (MVNO) or a local network operator.

20. The medium of claim 19 wherein the processor is further configured to execute programmed instructions stored in the memory further comprising determining at least one active element in the determined mobile network operator, wherein the at least one active element is preforming a specific service based on a user request.

21. The medium of claim 20 wherein the at least one active element is at least one of Online Charging System (OCS), Policy Charging and Rules Function (PCRF) or Home Subscriber System (HSS).

22. The medium of claim 19 wherein the processor is further configured to execute programmed instructions stored in the memory further comprising checking which one or more network elements in a home network of the mobile device of a roaming user should be addressed.

23. The medium of claim 19 wherein the processor is further configured to execute programmed instructions stored in the memory further comprising continuously updating routing tables of available wireless communications services.

24. The medium of claim 23 wherein the processor is further configured to execute programmed instructions stored in the memory for the determining wherein the determining the MVNO is further based on the identified one of the plurality of categories of wireless communication services using one or more of the routing tables.

25. The medium of claim 24 wherein the processor is further configured to execute programmed instructions stored in the memory further comprising transferring rules and data between active elements at the MVNO and an active element of the HPLMN.

26. The medium of claim 25 wherein the transferred rules comprise at least Policy Charging and Rules Function received from the PCRF component in the MVNO to PCRF component in HPLMN.

27. The medium of claim 25 wherein the transferred data is a received calculation of the billing to be charged the mobile device of the roaming user that is consuming roaming services and transfer the billing related data to the OCS in a home network for the mobile device of a roaming user.

* * * * *